United States Patent
ESTERS

[11] 3,729,642
[45] Apr. 24, 1973

[54] PLURAL STATOR DYNAMOELECTRIC MACHINE

[76] Inventor: Ernie B. Esters, 15915 Rutherford, Detroit, Mich.

[22] Filed: Aug. 5, 1971

[21] Appl. No.: 169,260

Related U.S. Application Data

[63] Continuation-in-part of Ser. No. 12,963, Feb. 20, 1970, Pat. No. 3,602,749.

[52] U.S. Cl. ..................310/112, 310/266, 310/154
[51] Int. Cl. ...........................................H02k 7/00
[58] Field of Search.....................310/266, 154, 46, 310/75, 269, 185, 112, 67

[56] References Cited

UNITED STATES PATENTS

| | | | |
|---|---|---|---|
| 3,602,749 | 8/1971 | Esters | 310/154 |
| 3,521,099 | 7/1970 | Jewusiak | 310/112 X |
| 3,539,849 | 11/1970 | Kampfen | 310/67 |
| 3,484,635 | 12/1969 | MacKallor, Jr. | 310/266 |
| 2,408,808 | 10/1946 | Paulus et al. | 310/75 |
| 393,636 | 11/1888 | Freeman | 310/269 X |
| 2,655,613 | 10/1953 | Wieseman | 310/269 X |
| 3,343,017 | 9/1967 | Pop | 310/266 |
| 3,532,916 | 10/1970 | Fisher | 310/266 |

FOREIGN PATENTS OR APPLICATIONS

| | | | |
|---|---|---|---|
| 1,039,127 | 9/1958 | Germany | 310/266 |

Primary Examiner—D. F. Duggan
Attorney—Robert C. Hauke et al.

[57] ABSTRACT

A dynamoelectric machine having coaxial inner and outer cylindrical stators and a pair of end stators with each stator being provided with a plurality of magnetic flux producing permanent magnets. The rotor is of a cylindrical configuration and is disposed in the magnetic gap between the inner and outer stators and the end stators and comprises a plurality of radially disposed coils, magnetic cores with windings and intermediate magnetic cores without windings disposed therebetween. The journal and support structure for the rotor and stators is of a configuration to permit maximum rotor and stator interface surface alignment and to provide maximum efficiency from the dynamoelectric machine.

14 Claims, 2 Drawing Figures

Patented April 24, 1973 3,729,642
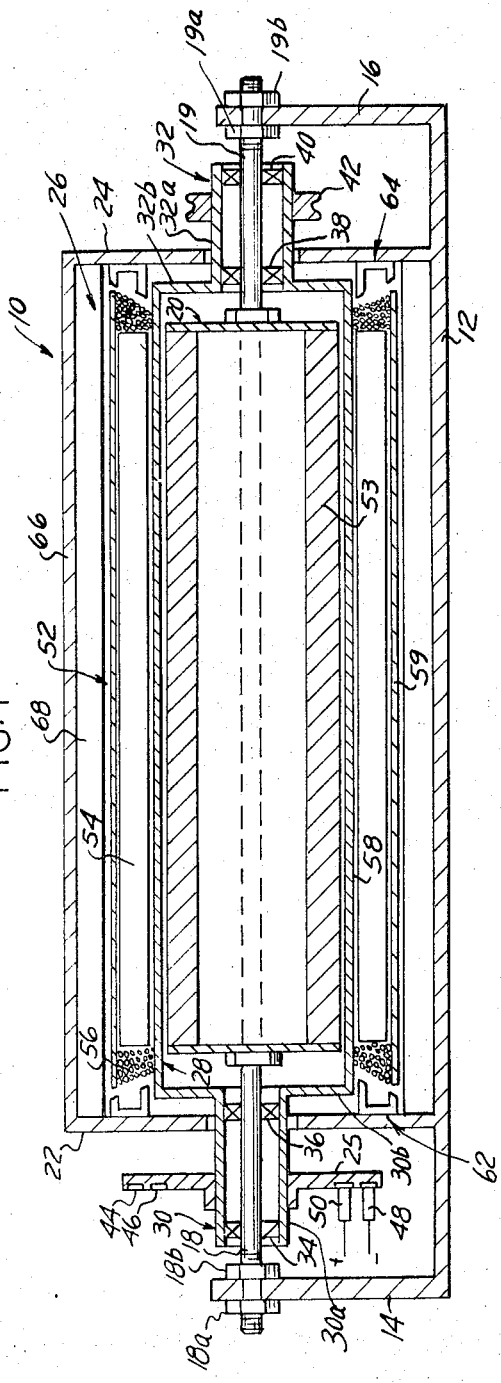
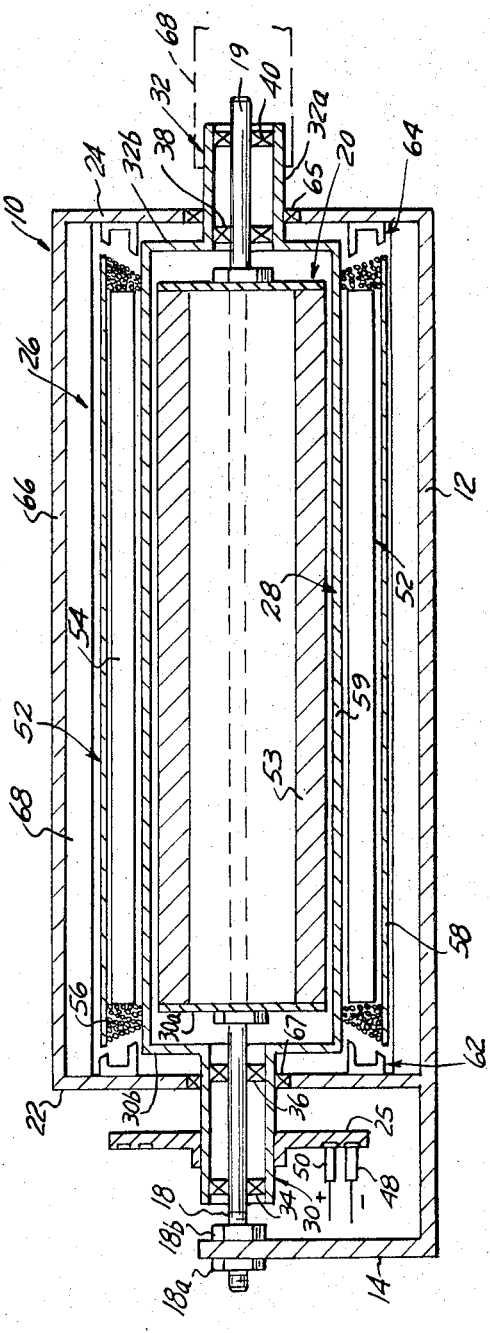
INVENTOR
ERNIE B. ESTERS
BY Hauke, Gifford & Patalidis
ATTORNEYS

PLURAL STATOR DYNAMOELECTRIC MACHINE

CROSS-REFERENCE TO RELATED APPLICATION

This application is a continuation-in-part application of U. S. application Ser. No. 12,963 filed on Feb. 20, 1970 for "Dynamoelectric Machine," now U.S. Letters Pat. No. 3,602,749, issued Aug. 31, 1971.

BACKGROUND OF THE INVENTION

1. Field of the Invention

The present invention relates to dynamoelectric machines capable of operating either in a motor mode or in a generator mode and, more particularly, relates to dynamoelectric machines havinb both radial and axial stators.

2. Description of the Prior Art

Conventional dynamoelectric machines, motors and generators are of the radial gap type, generally having an annular stator and a cylindrical rotor disposed internally of the stator. Electrical current, supplied to the windings of the rotor and/or stator, generates magnetic fields in the rotor and/or stator. In electrical motors, these magnetic fields react with each other or with other fields created by permanent magnets to produce forces of attraction and repulsion between the rotor and stator. In electrical generators, the rotation of the rotor causes an electromotive force to be induced in the windings. In such motor or generator arrangements, attraction and repulsion forces and induced electromotive forces are created at the cylindrical interface between the rotor and stator.

Another type of electric motors and generators, often called the axial-gap type, is provided with a disc-like rotor, keyed to a rotatable shaft. The stator or stators are axially arranged relatively to the rotor such that the interface or gap, through which the attraction and repulsion forces of the magnetic fields are exerted in motors and the variable magnetic fields incuding an electromotive force are created in generators, are axially or longitudinally aligned with respect to the machine housing and the rotatable shaft.

A still further type of dynamoelectric mahines, best represented by the structures disclosed in the above mentioned U. S. Pat. No. 3,602,749, presents the combined advantages of both the radial-gap and axial-gap types. A first cylindrical stator is disposed within a hollow cylindrical rotor and a second stator, also cylindrical in shape, is disposed so as to surround the rotor. Additionally, third and fourth stators are provided on the ends of the rotor so as to form an axial gap, or interface, between the annular ends of the rotor and the magnetic fields created by such stators. An electric motor or generator built according to such principle has a far greater efficiency than conventional motors or generators in view of the greatly increased interreaction between a multitude of magnetic fields and electrical windings. A problem arises in providing a structure for properly supporting the several stators in positions in alignment with the rotor and in providing for the rotative drive input to or drive output from the rotor.

SUMMARY OF THE INVENTION

The present invention has for a primary object the provision of electric motor generators having the above described rotor-stator configurations, whereby attraction and repulsion forces, or induced EMF, are generated at a maximum effective number of interfaces between the rotor and the stators, resulting in a more efficient device.

An important feature of this invention relates to the particular rotor support and journal structure which permits the use of a plurality of axially elongated magnetically permeable cores. The mode of construction and arrangement of the rotor and its journal support according to the instant invention permits the use of cores which are of a maximum length and substantially coextensive in length with both the inner and outer cylindrical stators. Every other rotor core is provided with a winding generating a radial magnetic field, in the motor application of the invention, and the windings are parallel or series connected in such manner that all the windings are generating magnetic fields in the same direction at a given time. Each core disposed between consecutive cores provided with a winding acts as a collector for a magnetic field directed in an opposite direction such that a plurality of magnetic fields, opposedly directed two by two, are created in the stator by way of only half the number of windings required in conventional structures. The support and journal construction according to the present invention also makes provision for coupling to means for driving the rotor or, alternately, to means for being driven according to rotation of the rotor, depending on whether the dynamoelectric machine is being operated in its generator or in its motor mode.

BRIEF DESCRIPTION OF THE DRAWINGS

The several objects and advantages of the present invention will become apparent to those skilled in the art when the following description of the two modes contemplated for practicing the invention is considered in conjunction with the accompanying drawings wherein like reference characters refer to like parts throughout the several views and in which:

FIG. 1 is a longitudinal sectional view of a dynamoelectric machine constructed in accordance with the present invention; and FIG. 2 is a longitudinal sectional view of an alternate embodiment likewise constructed in accordance with the present invention.

DETAILED DESCRIPTION OF THE EMBODIMENTS OF THE INVENTION

Referring to FIG. 1, a dynamoelectric machine 10 according to the present invention comprises a horizontal base 12 which carries at either end a pair of upstanding vertical frames 14 and 16. The frames 14 and 16 support at opposite ends shafts 18 and 19 to which shafts are attached an inner cylindrical stator 20. The shafts 18 and 19 may be constructed as stub shafts extending at either ends of the stator 20. Alternately, the shafts 18 and 19 may be the projecting ends of a single shaft such as indicated by dash lines. The shaft 18 is fixed to frame 14 and held fixed against rotation by a pair of lock nuts 18a, 18b. In a like manner, the shaft 19 is mounted and fixed against rotation by a pair of lock nuts 19a, 19b. An additional pair of vertical frames 22 and 24 are fixed to the base 12 inwardly of the frames 14, 16. Supported within the frames 22, 24 is an outer stator 26 which, similar to the inner stator 20, is of a cylindrical configuration. Supported for rotative movement between the inner and outer stators 20, 26 is a rotor 28. The rotor 28 has a pair of hubs 30 and 32 fixed to it at either end. The hub 30 includes a cylindrical portion 30a extending from the rotor end plate 30b. The hub 32 includes a cylindrical portion 32a extending from the rotor end plate 32b. The mounting for the rotor 28 comprises a suitable bearing means connected between the inner surface of the hubs 30, 32 and the periphery of the shafts 18, 19, respectively. The bearing means in each case includes a pair of spaced raceways 34, 36 and 38, 40, which raceways contain suitable individual bearing elements such as balls.

With further reference to FIG. 1, a belt drive pulley 42 is shown in driving engagement with the periphery of the right hand rotor hub 32. While the pulley 42 is shown as the driving element, it may similarly perform the function of a driven element coupled to a load according to whether the dynamoelectric machine 10 is being operated as a generator or a motor. At the left hand end of the machine 10, a commutator disc 25 is mounted on the left hand rotor hub 30 adjacent to but inwardly of the frame 14. The commutator disc 25 is formed of a rigid insulating material and supports on its outer face a plurality of conductive commutator strips 44 and 46 arranged in two concentric rings. As is well known in the art, the strips 44 and 46 are arcuate in shape and separated by insulating elements which are normally formed integrally with the disc 25. The outer surfaces of the conductive strips 44, 46 are flush one with the other so as to form continuous flat surfaces.

A pair of spring biased brushes 48 and 50 have their free ends engaged against the concentric rings formed by the conductive strips 44, 46, respectively. The free ends of the brushes 48, 50 make electrical contact with the separate consecutive conductive commutator strips 44, 46 as the commutator disc 25 rotates in unison with the hub 30. The brushes 48, 50 are supported in a manner known to the art and suitably coupled to a source of electrical potential. In the generator version of the dynamoelectric machine, the terminals for the brushes 48, 50 are connected across a suitable utilization circuit. Additionally, the conductive strips 44, 46 are connected by wires to the rotor windings as will be further explained hereinafter.

Included in the rotor 20 are a plurality of elongated rotor electromagnets 52 which are attached to the end plates of the rotor 20 by any convenient means and spaced at regular intervals about its perimeter. Each electromagnet 52 includes an elongated magnetically permeable core 54 which extends radially outward with respect to the rotor 20 and has its axis of elongation substantially parallel thereto. Each of the electromagnets 52 further includes a single multiturn electrical coil 56 wound around the core 54 in a direction substantially parallel to the longitudinal axis of the core and to the longitudinal axis of the dynamoelectric machine as represented by the center of shaft 19. All the windings 56 are wound about their respective magnetic cores 54 in such a manner that at any given time the electrical current circulating in the coils circulates in the same direction. It is a matter of choice as to whether the coils 56 are electrically connected in series or in parallel so long as at any given time the electrical current circulates in all the coils 56 in the same direction, thus creating magnetic fields substantially aligned radially along the radial axes of the magnetic core 54. It will be understood that the adjacent electromagnets 52 on the rotor 20 are separated by intermediate magnetic cores made of elongated flat metal members similar to the core wound cores 54. In this manner there is formed a hollow cylindrical rotor structure with a construction well known to the art. Suitable insulating inner and outer coatings 58 and 59 are provided for the rotor 20.

The dynamoelectric machine of the present invention thus includes the outer stator 26, the inner stator 20, and in addition a pair of permanent magnet end stators indicated by the numerals 62 and 64. The outer stator 26 is mounted between the end frames 22, 24 and is surrounded by a cylindrical outer housing 66. The outer stator 26 comprises a plurality of elongated horseshoe-type permanent magnets 68 arranged at equal angular intervals and spaced therefrom with their longitudinal axes substantially parallel to the axis of the rotor 20. The number of the magnets 68 included in the outer stator 26 is preferably equal to the number of rotor electromagnets 52. The inner stator 20 is supported centrally in the machine by the shaft ends 18, 19 and is similarly constructed to the outer stator and includes a plurality of magnets 53.

In FIG. 2 is shown an alternate embodiment of the invention. This embodiment differs from that of FIG. 1 in that it is particularly adapted for use where a driven means is coupled to the end of the right hand rotor hub 32. In the apparatus of FIG. 2, there is a single support 14 at the left end of the machine base 12. At the right hand end of the machine, there is provided a support to the stators 26 and 20 through an additional bearing means incorporated between the opening in the frame 24 and the outer surface of the rotor hub 32. This bearing is identified by the numeral 65 and may be incorporated as illustrated in the form of a raceway containing suitable bearing members. The rotation of the hubs 30 and 32 again is facilitated through the use of two bearings 34 and 36 at the left end and two bearings 38 and 40 at the right end. An additional rotative support is provided for the rotor hub 30 at the left end of the machine by a bearing and raceway construction identified by the numeral 67. With respect to the other components of the outer and inner stators and the rotor itself, the apparatus of FIG. 2 is substantially the same as that of FIG. 1. An important feature contained in both embodiments relates to the construction of the support and journal structure for the dynamoelectric machine which provides maximum interface coaction between the stators 20 and 26, respectively, and the rotor 20. This coaction is provided for, while at the same time there is maintained proper spatial relationship between the parts to provide for the radial-gap relationship between the rotor 20 and the end stators 62 and 64 positioned at either end of the machine 10.

Either embodiment of the invention may be used in either the generator or motor mode. The two embodiments provide a choice between off-center type belt drive as shown in FIG. 1 or shaft drive as shown in FIG. 2. The coupling device 68, as shown in FIG. 2, is connectable to any suitable driving device or load device according to the mode in which the dynamoelectric machine 10 is being operated. In the interest of brevity and simplification, the detailed description of the complete electrical system of the machine will not be reiterated in this application; reference may be made to my above mentioned application for this description.

It will thus be seen that the present invention provides an improved form of dynamoelectric machine giving both axial and radial operation gap relationship for the operation of the machine.

What is claimed is:

1. In a dynamoelectric machine having an outer stator, an inner stator and a rotor mounted for rotation therebetween, the combination comprising:
   a base;
   a pair of upstanding frames fixed at either end of said base for mounting said inner stator and said outer stator therebetween;
   said inner stator having a pair of axially extending end shafts, each fixed to a respective one of said frames;
   said rotor including a pair of hubs, one at each rotor end;
   each of said hubs including an inner bearing between it and a respective end shaft of said inner stator; and
   a drive means coupled to one of said rotor hubs.

2. The combination as set forth in claim 1 wherein an additional plurality of permanent magnets forming a second outer stator are mounted on the inner surface of each of said frames, said magnets operable to form additional magnetic fields for additional interaction with said rotor during its rotation.

3. The combination as set forth in claim 1 wherein a plurality of magnetically permeable cores are mounted about said rotor and a plurality of electrical coil windings are included, each wound about alternate ones of said cores and electrically connected to a power source to provide an electrical current circulating therethrough whereby magnetic fields are directed in the same direction are provided in each such alternate core.

4. The combination as set forth in claim 3 wherein each of said cores comprises an elongated flat member having its longitudinal axis substantially parallel to the axis of said rotor and of a length substantially coextensive with that of said stators.

5. The combination as set forth in claim 1 wherein said bearings each comprise a spaced pair of bearing containing raceways and whereby said drive means comprises a belt drive pulley maintained in driving engagement with the outer surface of one of said hubs.

6. In a dynamoelectric machine having a base, a pair of side frames, and a pair of opposed openings formed in said frames, said machine including an inner and an outer stator, each fixed between said frames and an intermediate rotor cooperable with both said stators, the improvement comprising:
   said inner stator having a shaft projecting from each end, one of said shafts adapted to hold said stator in a fixed, aligned position relative to one of said frame openings;
   said rotor including an extended hub at each end;
   each of said hubs enclosing and in longitudinal alignment with an associated one of said shafts;
   a first bearing mounted between each of said stator shafts and the inner surface of the associated one of said hubs for providing rotative support of said rotor; and
   a second bearing mounted between the outer surface of each of said rotor hubs and the associated frame opening to provide further rotative support for said hub relative to said opening.

7. The combination as set forth in claim 6 wherein an additional plurality of permanent magnets forming a second outer stator are mounted on the inner surface of each of said frames, said magnets operable to form magnetic fields for additional interaction with said rotor during its rotation.

8. The combination as set forth in claim 6 wherein said rotor includes a plurality of magnetically permeable cores and a plurality of electrical coil windings, each of said windings wound about every other one of said cores and electrically connected to a power source to provide an electrical current circulating therethrough, whereby magnetic fields all directed in the same direction are provided in each alternate core.

9. The combination as set forth in claim 8 wherein each of said rotor cores comprises an elongated flat member having its longitudinal axis substantially parallel to the axis of said rotor and substantially coextensive in length with it and each of said stators.

10. The combination as set forth in claim 9 wherein said bearings comprise in each instance a pair of uniformly spaced bearings including raceways and wherein a drive means is included for said rotor, said drive means comprising a belt maintained in driving arrangement with the outer surface of one of said hubs.

11. The combination as set forth in claim 6 wherein said bearings comprise in each case spaced bearing including raceways and individual bearing members contained in said raceways and wherein said drive means comprises a shaft coupled with one of said hubs of said rotor.

12. In a dynamoelectric machine having a base, a pair of side frames fixed to said base, and a pair of opposed openings formed in said frames, said machine including an inner and an outer stator, each fixed between said frames and an intermediate rotor cooperable with both said stators, the improvement comprising:
   a support extending upwardly from said base outwardly from one of said frames;
   said inner stator having a shaft projecting from each end, one of said shafts fixed to said support and journaled through one of said openings;
   said rotor including an extended hub at either end, each of said hubs enclosing and in coaxial alignment with an associated one of said shafts;
   a first bearing mounted between each of said stator shafts and the inner surface of the associated one of said hubs for providing rotative support of said rotor; and
   a second bearing mounted intermediate the outer surface of each of said rotor hubs and the associated frame opening to provide further rotative support for said hub.

13. The combination as set forth in claim 12 wherein a drive means for said rotor is coupled to one of said hubs, said drive means comprising a drive shaft coaxial with said hub.

14. The combination as set forth in claim 12 wherein said bearings for said hubs comprise in each case a spaced pair of bearings including raceways and individual bearing members contained therein and wherein a drive means is included for said rotor, said drive means comprising a drive shaft connected to said hub.

* * * * *